Aug. 25, 1942.  C. C. BELL ET AL  2,293,794
ADHESIVE APPLYING ROLL
Filed July 30, 1941  3 Sheets-Sheet 1

INVENTOR
Charles C. Bell
Paul S. Dixon
By their attorney

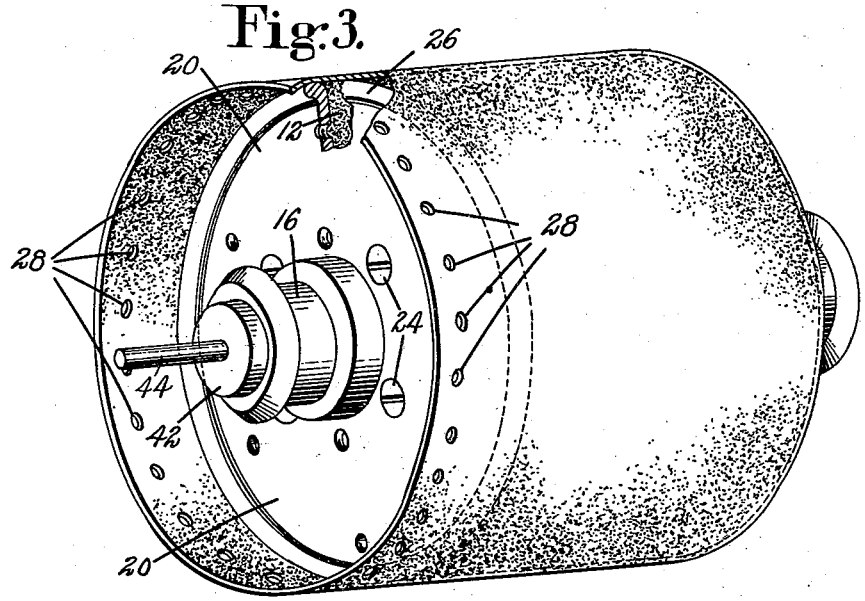
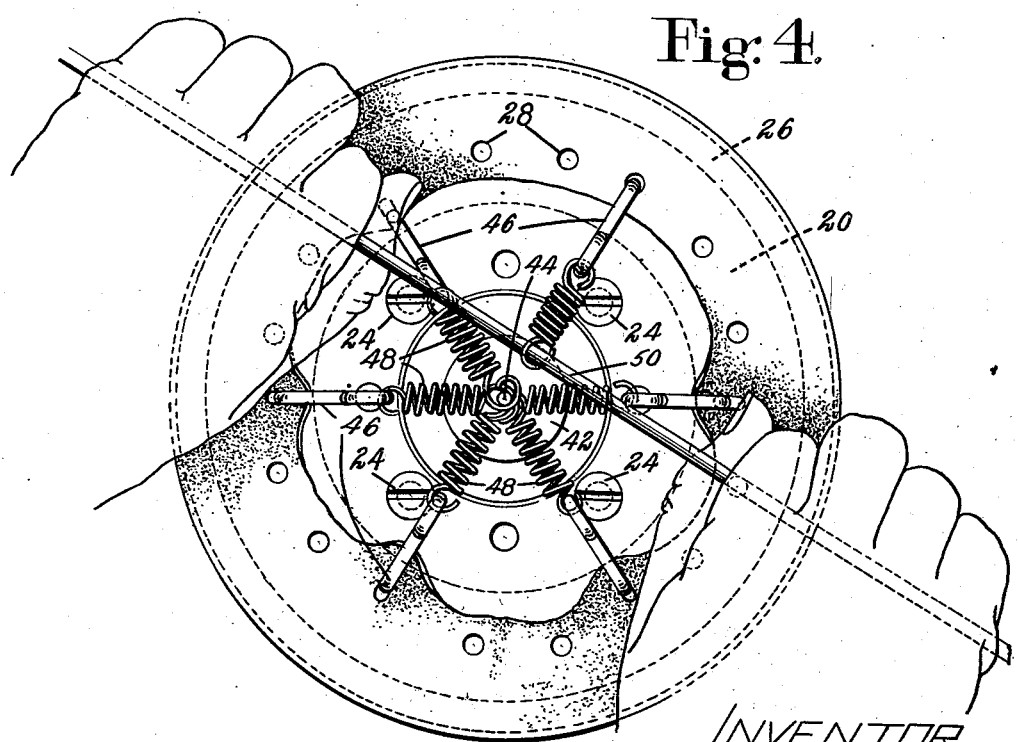

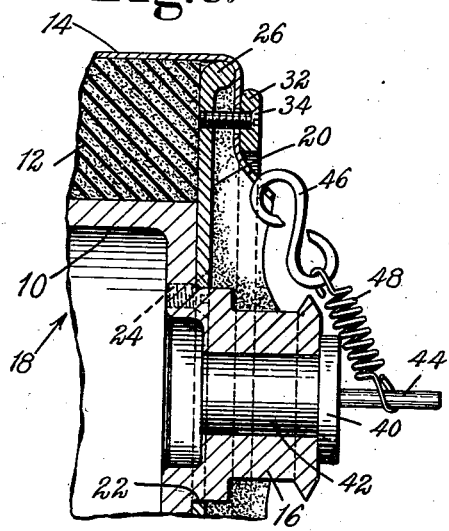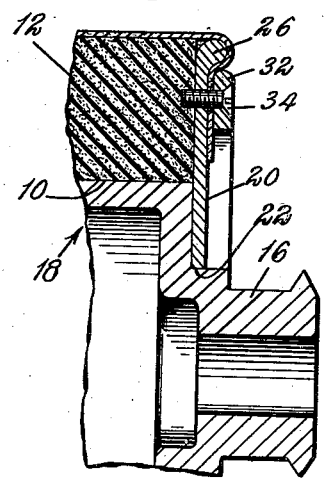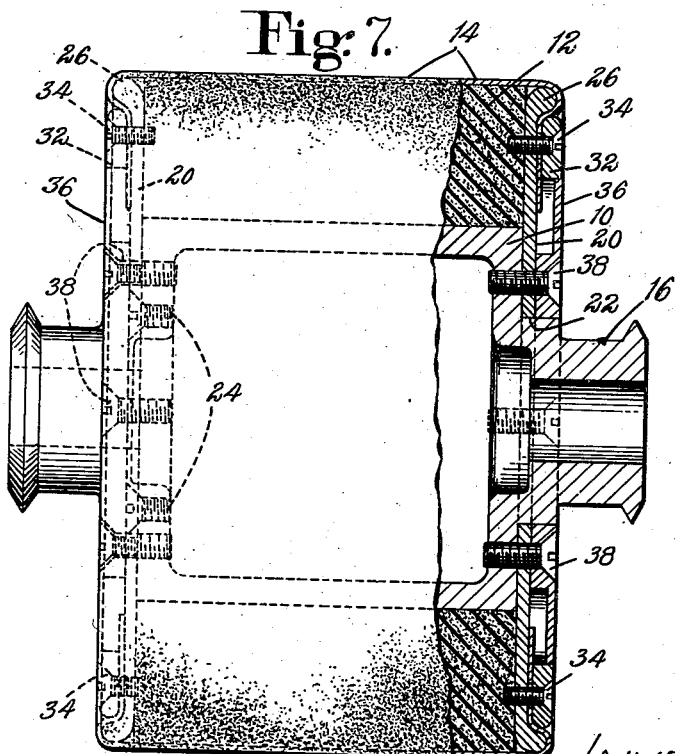

Patented Aug. 25, 1942

2,293,794

UNITED STATES PATENT OFFICE 2,293,794

ADHESIVE APPLYING ROLL

Charles C. Bell, Marblehead, and Paul H. Dixon, Wenham, Mass., assignors to United Shoe Machinery Corporation, Flemington, N. J., a corporation of New Jersey Application July 30, 1941, Serial No. 404,610

10 Claims. (Cl. 91—67.8)

This invention relates to a method of and apparatus for assembling a covered roll for applying adhesive to parts of shoes, for example, soles of shoes, and is herein illustrated as applied to assembling a resilient sleeve upon a rubber roll.

In order to apply an adhesive, for example, rubber cement or latex, to the entire surface of the sole, it is necessary to employ a roll having a deformable surface which will conform to the surface of the sole, particularly around the shank portion where it is beveled off at an angle. A rubber roll is not good for this purpose because rubber cement and latex attack its surface, causing it to deteriorate in a short time. Synthetic rubber-like materials have been used to some extent because they are not adversely affected by the rubber cement or latex. However, these synthetic rubber-like materials are expensive and not soft enough to conform accurately to the surface of the sole.

In order to attain the necessary deformable surface and at the same time one not subject to deterioration, as illustrated herein, a roll is provided which is made up of a soft and yieldable core of rubber over which there is slipped a sleeve composed of a synthetic rubber-like material. This roll is used in a machine of the type disclosed in United States Letters Patent No. 1,780,341, granted November 4, 1930, on an application filed in the name of J. W. Cosgrove. Ordinarily, several thousand pairs of soles are passed through this machine in the course of a day and the surface of the roll, which is deformed considerably each time a sole is passed over it, is therefore subjected to a severe and repeated flexing. The repeated flexing causes shifting between the surface of the rubber core and sleeve which tends to produce wrinkling and to loosen the sleeve on the core.

It is an object of the present invention to provide an improved method for mounting the sleeve on the core and securing it thereto in such a fashion as to minimize the relative movement between the sleeve and core under repeated deformation and to insure a smooth surface at all times. It is a further object of the invention to provide means to facilitate assembling the sleeve and core.

As illustrated herein, and in accordance with the aforesaid objects, our novel method in one aspect includes one or more of the following steps, to wit, slipping the sleeve over the core and permanently securing one end of the sleeve to one end of the core, gathering the opposite end of the sleeve inwardly about the opposite end of the core and temporarily securing it at a plurality of points under high tension, and, finally, while the sleeve is held under tension, progressively working it along the surface of the core from the permanently secured end toward the temporarily secured end and, when all the slack has been taken up, permanently fastening the temporarily secured end to the end of the core.

A feature of the invention, from another viewpoint, resides in apparatus for holding the sleeve under tension while it is worked along the core and for taking up the slack in the sleeve, which apparatus consists of a pin rigidly but removably mounted on the hub of the core, a plurality of fastening members which may be hooked into the end of the sleeve, and a plurality of springs which may be fastened to the free ends of the hooks and drawn inwardly to engage the pin.

The method of and apparatus for assembling the aforesaid roll will now be described specifically with reference to the accompanying drawings, in which Fig. 1 shows an angular view of the core of the roll;

Fig. 3 shows an angular view of the roll with the sleeve fastened at one end and the assembling pin mounted in the opposite end of the hub of the roll;

Fig. 4 shows an end view of the roll and the means for drawing the end of the sleeve over the end of the core;

Fig. 5 shows a fragmentary section of the roll with the fastening means in place;

Fig. 6 shows a fragmentary section of the roll with the securing ring in place; and Fig. 7 shows the completely assembled roll, partly in section.

Figure 1:
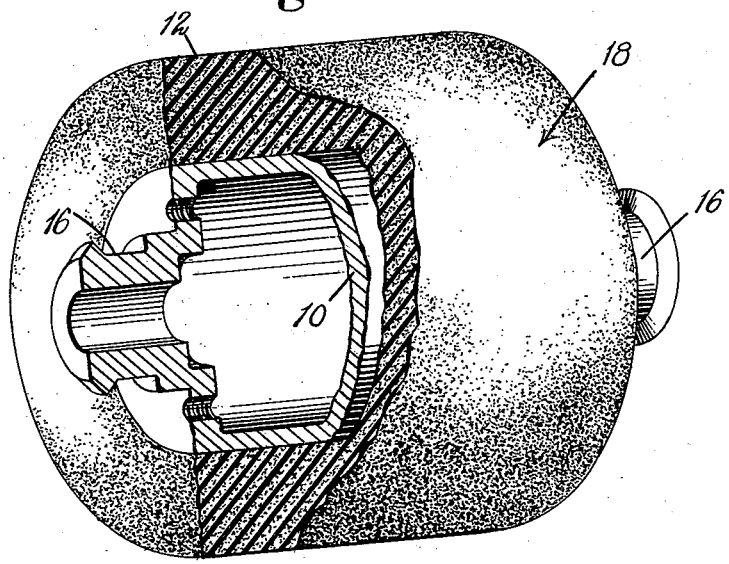

Referring to Fig. 7, the assembled roll is shown as consisting of an arbor 10, a cylindrical cushion 12 mounted thereon, and a sleeve 14 surrounding the cushion 12. The arbor 10, as shown in Fig. 1, is provided with hubs 16 which project from its opposite ends, the latter having axial openings therein to receive a shaft by which the roll when completed, as will appear hereinafter, may be journaled in a cement applying machine of the type referred to above. The cylindrical cushion 12 is composed of a soft rubber which is readily deformable and of such thickness as to accommodate the full thickness of the sole, and is vulcanized or otherwise fastened by cement to the arbor, the ends of the cushion terminating flush with the ends of the arbor. The arbor and the cushion mounted thereon will be hereinafter referred to for convenience as the "core" of the roll and will be designated by the reference character 18.

The sleeve 14, which is to be placed upon the core 18, is a seamless elastic tube composed of a synthetic rubber-like material which will not deteriorate upon exposure to adhesives. Any of the synthetic rubber-like materials may be employed, for example, Koroseal, a polyvinyl chloride material, or neoprene.

Figure 2:
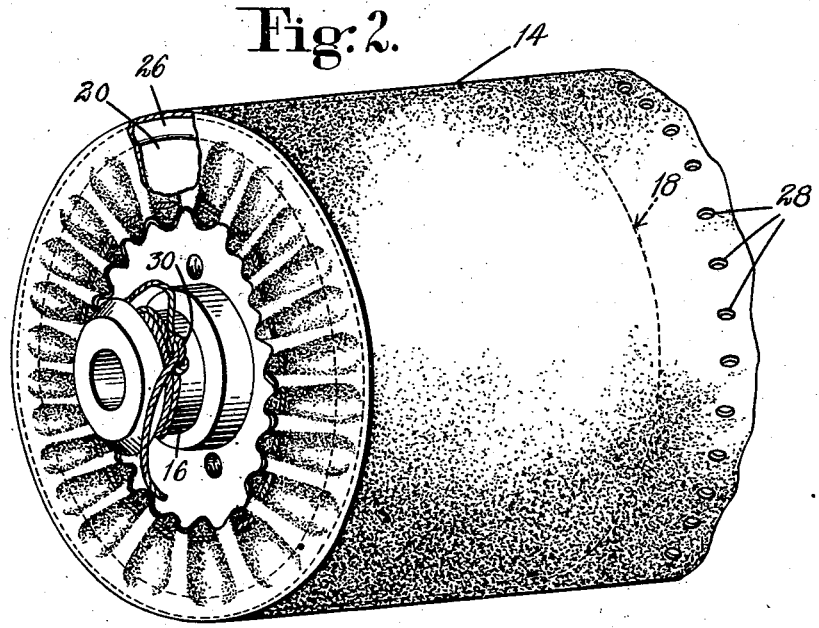
Fig. 2 shows an angular view of the core with the sleeve mounted thereon and partially fastened at one end.

The inside surface of the sleeve 14 fits closely over the surface of the core 18 and, in order to reduce the friction between the two to facilitate mounting the sleeve on the core, the surface of the core 18 is coated with a lubricant, such as glycerin, although any other friction-reducing material may be employed. After the core 18 has been coated with a lubricant, the sleeve 14 is slipped thereover, as shown in Fig. 2, with its ends extending beyond the ends of the core. Metal end plates 20 having central openings 22 therein are then placed over the hubs 16 and pushed in against the ends of the arbor 10, as shown in Fig. 3, where they are secured by screws 24. The periphery of each of these plates 20 is provided with an outturned bead 26 (Fig. 5) the outside diameter of which is substantially the same as the diameter of the core 18. These metal plates 20 provide a rigid framework about which the ends of the sleeve 14 may be pulled and fastened without deforming the ends of the core, as would happen if there were no such plates.

Before, or after (whichever is more convenient), the sleeve 14 is mounted on the core 18, a plurality of holes 28 are punched around the entire periphery of the sleeve 14 at each end, as shown in Fig. 3. As a preliminary step, one end of the sleeve is permanently secured to one end of the core as follows. A draw string 30 (Fig. 2) is threaded through the perforations 28 at one end of the sleeve and is pulled up to draw the projecting end of the sleeve inwardly about the end of the core 18 over the bead 26. The draw string 30 is drawn up as tightly as possible and fastened to the hub 16, as shown in Fig. 2, by knotting it. Thereafter, a ring 32 (Fig. 7) is placed over the end of the roll and fastened to the plate 20 by screws 34. The outside diameter of this ring is substantially the same as the inside diameter of the bead 26 and its peripheral surface is rounded so as not to cut into the sleeve. When, therefore, the ring is held up tightly against the plate 20 by the screws 34, the sleeve is pinched between the ring and the bead so that it is firmly anchored. The draw string is then removed and the end of the sleeve is trimmed off to remove the puckered portion thereof. In order to impart a finished appearance to the end of the roll, an end plate 36 which fits the opening in the ring 32 is then slipped over the hub 16 and fastened to the arbor by screws 38.

Having fastened one end of the sleeve 14 permanently to one end of the core 18, it is now necessary to draw the sleeve over the opposite end and fasten it while under such tension that there will be no possibility for wrinkles or bulges to form in the surface of the roll after use, even after being subjected to continuous severe deformation. To accomplish this, the free end of the sleeve 14 is drawn inwardly about the end of the core 18 and successive portions thereof are temporarily secured under high tension. Thereafter the entire sleeve is worked from the permanently secured end toward the temporarily secured end by pushing local areas along the core 18 until all the slack is pushed over the end of the roll and taken up. Then, while still held under the aforesaid tension, which is maintained throughout the process, the inwardly drawn sleeve is fastened permanently to the end of the roll.

In carrying out this method of assembly, a plug 40 having a reduced portion 42 is inserted in the end of the hub 16, as shown in Fig. 5. The plug has formed integral therewith a pin 44 which projects axially outwardly from the end of the hub 16. A hook 46 is passed through each of the perforations 28 in the end of the sleeve 14 and a stiff helical spring 48 with end loops is secured at one end to each of the hooks 46. A rod 50 is then passed through the opposite end of each spring to afford a hold for stretching each spring inwardly (Fig. 4) until it may be hooked over the pin 44, thereby drawing that portion of the sleeve to which it is attached inwardly over the end of the core. When all the hooks 46 have been drawn inwardly and secured in place, the roll is placed upon its side and the sleeve 14 is worked over the core from the permanently fastened end toward the temporarily fastened end by pushing local areas of the sleeve along the surface of the core. This may be done by placing the thumbs against a portion of the sleeve and pushing it along so that the slack is taken up by the springs 48 at the end of the roll. The relative movement between the surface of the core 18 and the inside surface of the sleeve 14 is facilitated by the presence of the lubricant which was placed upon the core at the beginning of the process. When the whole surface has been worked over in this manner and all the slack has been taken out of the sleeve so that the free end thereof is held tightly over the end of the roll, the sleeve is fastened permanently to the end of the roll, in a manner similar to that employed for fastening the opposite end, by placing a ring 32 over this end and screwing it into place, as shown in Fig. 6. Thereafter the hooks 46 and springs 48 are removed, the sleeve is trimmed off, and a cover plate 36 is screwed into place to complete the assembly of the roll.

Because there are some slight imperfections and irregularities in the thickness of the sleeve 14 due to imperfect manufacture, it is necessary to place the assembled roll in a grinding machine and to grind the surface of the sleeve perfectly smooth. When this grinding operation has been completed, the roll is in condition to be used in the cementing machine referred to above.

Having described our invention, what we claim as new and desire to secure by Letters Patent of the United States is:

1. A method of assembling a covered roll which consists of a core and a sleeve comprising slipping the sleeve over said core, permanently securing one end of the sleeve to one end of the core, gathering the other end of the sleeve inwardly about the other end of the core, applying tension to said other end of the sleeve, temporarily securing said other end of the sleeve at a plurality of points under continuing high tension, progressively working the sleeve along the surface of the core from the permanently secured end toward the temporarily secured end, and thereafter permanently fastening said temporarily secured end, while under tension, to the end of the core.

2. A method of assembling a covered roll which consists of a core and a sleeve comprising applying a coating of lubricant to the core, slipping the sleeve over said core, permanently securing one end of the sleeve to one end of the core, gathering the other end of the sleeve inwardly about the other end of the core, applying tension thereto, temporarily securing said other end of the sleeve at a plurality of points under continuing high tension, progressively working the sleeve along the surface of the core from the permanently secured end toward the temporarily secured end, and thereafter permanently fastening said temporarily secured end, while under tension, to the end of the core.

3. A method for assemblying a covered roll which consists of a core and a sleeve comprising coating the core with a lubricant, slipping the sleeve over said core, permanently securing one end of the sleeve to one end of the core, pulling the opposite end of the sleeve inwardly over the opposite end of the core toward the center thereof, subjecting a plurality of points on the inwardly drawn sleeve to a continuing severe tension which draws said portions toward the center, progressively working the sleeve along the surface of the core from the first-named end toward the second-named end to cause successive increments of the sleeve to creep over the end of the roll, and permanently fastening the second-named end of the sleeve to the end of the core while the sleeve is maintained under the aforesaid tension.

4. A method for assembling a covered roll which consists of a core and a sleeve comprising coating the core with a lubricant, slipping the sleeve over said core, permanently securing one end of the sleeve to one end of the core, gathering the other end of the sleeve inwardly over the other end of the core, subjecting a plurality of portions on the inwardly drawn sleeve to severe tension, temporarily fastening resilient means to said portions, while under tension, and to the core, progressively working successive portions of the sleeve from the first-named end to the second-named end, said lubricant reducing the friction between the sleeve and core so that the sleeve will move relative to the core to pass the slack over the end of the core, said resilient means taking up the slack, and thereafter permanently securing the inwardly gathered sleeve, while under tension, to the end of the core.

5. A method of assembling a covered roll which consists of a core and a sleeve comprising slipping the sleeve over said core, permanently securing one end of the sleeve to one end of the core, punching a plurality of spaced holes in the opposite end of the sleeve, fastening a resilient anchoring means through each hole and pulling it radially inward toward the axis of the roll, securing said anchoring means temporarily under tension, progressively working the sleeve along the surface of the core from the permanently secured end to the temporarily secured end, and thereafter permanently fastening said temporarily secured end to the end of the core while said anchoring means are holding said sleeve under tension.

6. A method of assembling a covered roll which consists of a core and a sleeve comprising slipping the sleeve over said core, permanently securing one end of the sleeve to one end of the core, taking hold of a portion of the free end of the sleeve and pulling it radially inward toward the center of the end of the roll, temporarily securing said portion under tension, thereafter pulling in and securing successive portions around the entire periphery of the end of the sleeve, working the sleeve, while it is held under tension, along the surface of the core by pushing local areas so as to stretch the sleeve in a direction toward the temporarily secured end, and permanently fastening said temporarily secured end, while it is held under tension, to the end of the core.

7. Apparatus for assembling a roll composed of a core and a sleeve, the latter having been placed upon said core and permanently secured at one end, comprising a pin rigidly mounted at the end of said core, means including a tension spring for yieldably fastening a plurality of portions of the opposite end of the sleeve temporarily to said pin, said means being adapted to take up the slack in the sleeve as it is worked toward that end by the application of pressure to the sleeve, and means for permanently securing the second-named end of the sleeve to the end of the core while said first-named means are holding said sleeve under tension.

8. Apparatus for assembling a roll composed of a core and a sleeve, the latter having been placed upon said core and permanently secured at one end, comprising a pin rigidly mounted at one end of said core, and means including a tension spring for yieldably fastening a plurality of portions of the opposite end of the sleeve temporarily to said pin, said means having a portion which may be anchored to the sleeve and a portion which may be anchored to the pin.

9. Apparatus for assembling a roll composed of a core and a sleeve, the latter having been placed upon said core and permanently secured at one end, comprising a pin rigidly mounted at one end of said core, and means for yieldably fastening a plurality of portions of the opposite end of the sleeve temporarily to said pin, said means comprising a plurality of stiff springs one end of each of which may be anchored to the sleeve and the other end of each of which may be anchored to the pin.

10. Apparatus for assembling a roll composed of a core and a sleeve, the latter having been placed upon said core and permanently secured at one end, comprising a pin rigidly mounted at one end of said core, and means for yieldably fastening a plurality of portions of the opposite end of the sleeve temporarily to said pin, said means comprising a plurality of stiff springs, each spring having a hook at one end and a loop at the other end, said hook being adapted to be anchored to the sleeve and said loop being adapted to fit over the end of the pin to hold the spring under tension.

CHARLES C. BELL.
PAUL H. DIXON.